United States Patent [19]

Elmore et al.

[11] Patent Number: 5,793,191

[45] Date of Patent: Aug. 11, 1998

[54] ZERO VOLTAGE SWITCHING SUPPLIES CONNECTED IN PARALLEL

[75] Inventors: Michael Shane Elmore, Endicott, N.Y.; Kenneth Andrew Wallace, Lewis Center, Ohio

[73] Assignee: Celestica, Inc., Toronto, Canada

[21] Appl. No.: 934,568

[22] Filed: Sep. 22, 1997

Related U.S. Application Data

[63] Continuation of Ser. No. 510,794, Aug. 3, 1995, abandoned.

[51] Int. Cl.$^6$ ................................. G05F 1/40; H02M 7/00
[52] U.S. Cl. ........................... 323/272; 323/282; 363/65
[58] Field of Search .............................. 323/282, 283, 323/284, 285, 225, 272; 363/65, 72

[56] References Cited

U.S. PATENT DOCUMENTS

| | | |
|---|---|---|
| 3,436,647 | 4/1969 | Gobeli et al. . |
| 3,887,820 | 6/1975 | Glennon . |
| 4,338,658 | 7/1982 | Toy . |
| 4,874,961 | 10/1989 | Henderson . |
| 4,886,981 | 12/1989 | Lentini et al. ............... 363/72 |
| 5,029,064 | 7/1991 | Ball ............................. 363/65 |
| 5,250,777 | 10/1993 | Fishman ....................... 363/96 |

FOREIGN PATENT DOCUMENTS

| | | |
|---|---|---|
| 0173768 | 3/1986 | European Pat. Off. . |
| 0188638 | 7/1986 | European Pat. Off. . |
| 61-81180 | 4/1986 | Japan . |
| 2184226 | 7/1990 | Japan . |
| 838897 | 6/1981 | U.S.S.R. . |
| 9502919 | 1/1995 | WIPO . |

OTHER PUBLICATIONS

K. H. Liu and F.C. Lee "Zero–Voltage Switching Technique in DC/DC Converters," IEEE Trans. On Power Electronics, vol. 5, No. 3, Jul. 1990. pp. 293–304.

*Primary Examiner*—Peter S. Wong
*Assistant Examiner*—Bao Q. Vu
*Attorney, Agent, or Firm*—Blake, Cassels & Graydon

[57] ABSTRACT

A composite power supply comprises a master ZVS power supply and a slave ZVS power supply. Using a phase lock loop circuit, the composite power supply detects a phase relationship between switching of the first switch and switching of the second switch, and adjusts timing of switching of the second switch if the first switch and the second switch are not being switched at a predetermined phase relationship with each other. The outputs of the two power supplies are connected together. Thus, the master power supply contributes approximately half the output power and precision control on the output/load voltage while the slave power supply contributes approximately half the output power.

27 Claims, 11 Drawing Sheets

ZERO VOLTAGE SWITCHING SUPPLIES CONNECTED IN PARALLEL

This application is a continuation, of application Ser. No. 08 / 510,794 filed Aug. 3, 1995, now abandoned.

BACKGROUND OF THE INVENTION

The present invention relates generally to power supplies, and deals more particularly with a plurality of zero voltage switching power supplies connected in parallel to collectively supply a load.

Zero voltage switching (ZVS) power supplies are well known in the industry to convert a DC input voltage to a different DC output voltage. There are two basic configurations—"buck" which yields an output voltage less than the input voltage, and "boost" which yields an output voltage greater than the input voltage. The basic prior art buck configuration is illustrated in FIG. 1 as power supply 10, and comprises a series FET switch 12, series inductor 14, parallel diode 16 and parallel, output capacitor 20. When switch 12 is closed, a current flows through inductor 14 to supply a load 22 and charge capacitor 20. Subsequently, switch 12 is opened to block or "buck" the input power, but inductor 14 and capacitor 20 continue to deliver stored energy to the load in the manner of a low pass filter. The closing and opening of switch 12 is repeated to yield a DC output voltage, less than the input voltage, with ripple. A control 28 times the closing and opening of switch 12 based on an error voltage generated by a comparison 39 of the load voltage to a reference voltage to maintain the load voltage within a specified range. Control 28 also ensures that each closure of switch 12 occurs when there is approximately zero volts across switch 12 to minimize surge currents and switching losses.

FIG. 2 illustrates the basic prior art configuration of a boost power supply 40. Boost power supply 40 comprises series inductor 42, a series diode 44, a parallel FET switch 46 and a parallel output capacitor 50. When switch 46 is closed, a current flows through inductor 42 and switch 46 to ground. Under these conditions, the full input voltage is applied across inductor 42 with the input end of the inductor exhibiting a higher voltage than the other end. Diode 44 is reversed biased at this time to prevent discharge of capacitor 50. Subsequently switch 46 is opened, and inductor 42 attempts to maintain the same level and direction of current flow as existed immediately before the switch was opened. However, at this time the current path includes capacitor 50 and a load 52. Thus, the inductor voltage switches polarity and a voltage greater than the input voltage is developed at this other end and applied to the load 52 and capacitor 50. This maintains the current flow through inductor 42 that existed immediately before the switch was opened. This current flows through inductor 42, through diode 44, to the load 52 and to capacitor 50, charging capacitor 50. Control 58 times the closing and opening of switch 46, based on a comparison 60 of a ramp voltage to a reference or "error" voltage to maintain the output voltage within a specified range. The error voltage itself is based on a comparison 61 of the load voltage to a reference voltage. Control 58 also ensures that each closure of switch 46 occurs when there is approximately zero volts across switch 46 to minimize switching losses.

For some applications, it is desirable to utilize two or more ZVS power supplies in parallel to collectively supply the load (when one power supply alone is insufficient). However, the composite switching ripple should be minimized.

Accordingly, a general object of the present invention is to provide two or more ZVS power supplies in parallel to collectively supply a load, but minimize composite switching ripple.

SUMMARY OF THE INVENTION

The invention resides in a composite power supply comprising a master ZVS power supply with a first ZVS switch and a first switch control and a slave ZVS power supply with a second ZVS switch and a second switch control. The composite power supply detects a phase relationship between switching of the first switch and switching of the second switch, and adjusts timing of switching of the second switch if the first switch and the second switch are not being switched at a predetermined phase relationship with each other.

According to one feature of the present invention, the composite power supply comprises a phase lock loop circuit which monitors phase relationship between switching of the first switch and switching of the second switch. An output of the phase lock loop circuit is used to adjust the timing of switching of the second switch. The outputs of the two power supplies are connected together. Thus, the master power supply contributes approximately half the output power and precision control on the output/load voltage while the slave power supply contributes approximately half the output power.

DETAILED DESCRIPTION OF THE PREFERRED EMBODIMENTS

Figure 1:
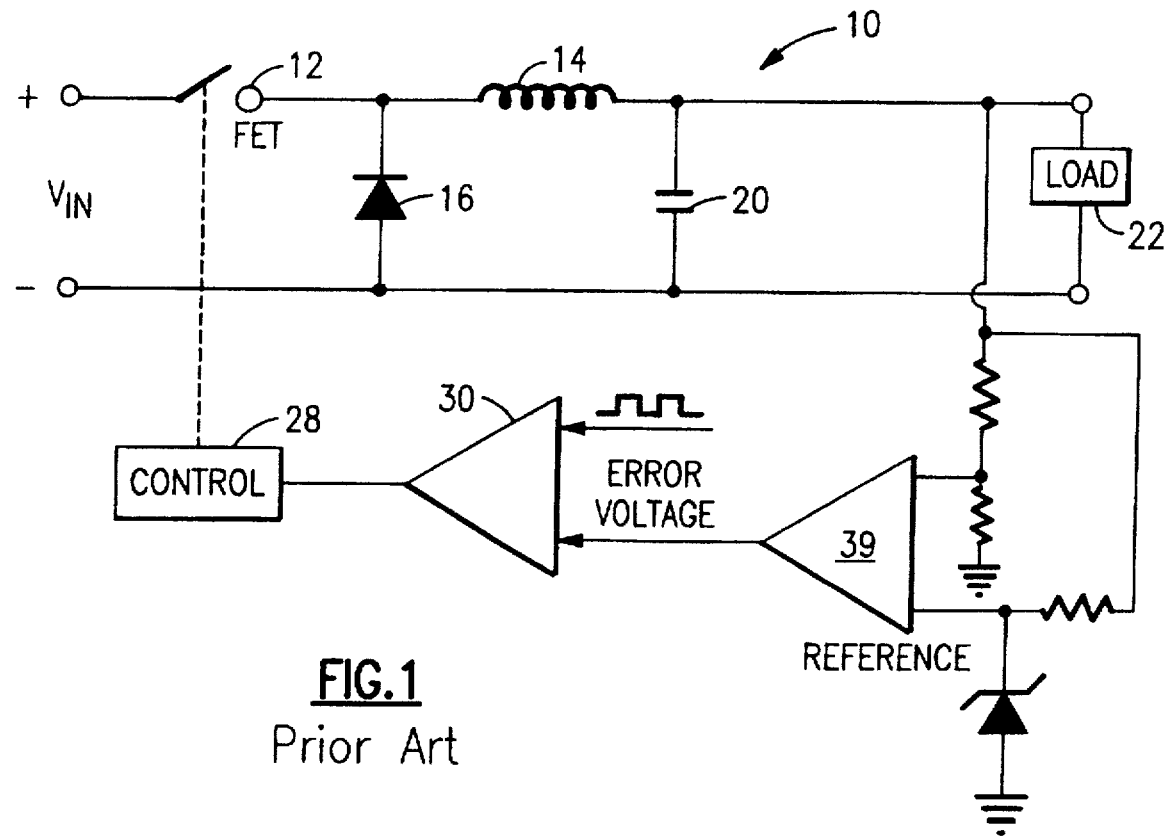
FIG. 1 is a circuit diagram of a single buck power supply according to the prior art.
Figure 2:
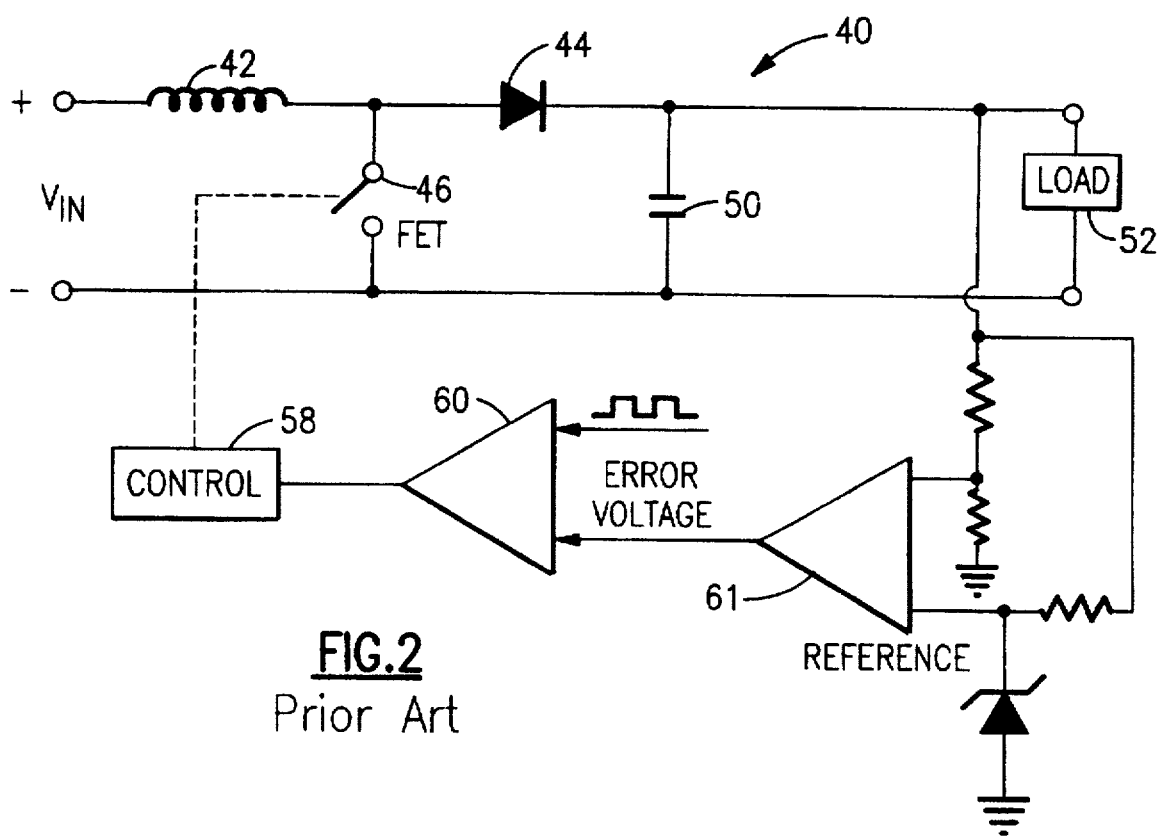
FIG. 2 is a circuit diagram of a single boost power supply according to the prior art.
Figures 3, 3A:
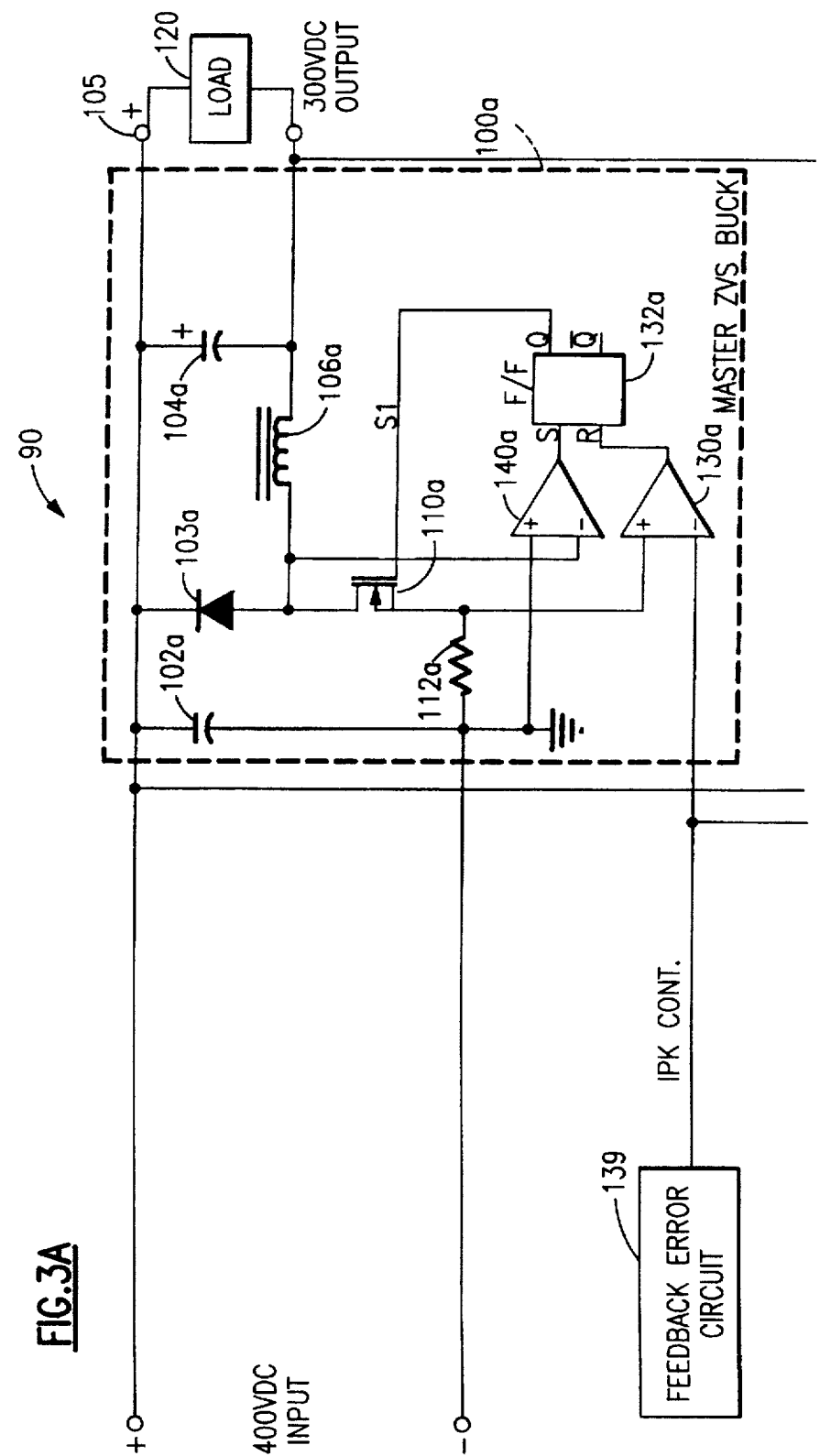
FIG. 3. comprising FIGS. 3A and 3B in the indicated fashion, in the indicated fashion is a circuit diagram of a composite buck power supply with one master power supply and one slave power supply according to the present invention.
Figure 3B:
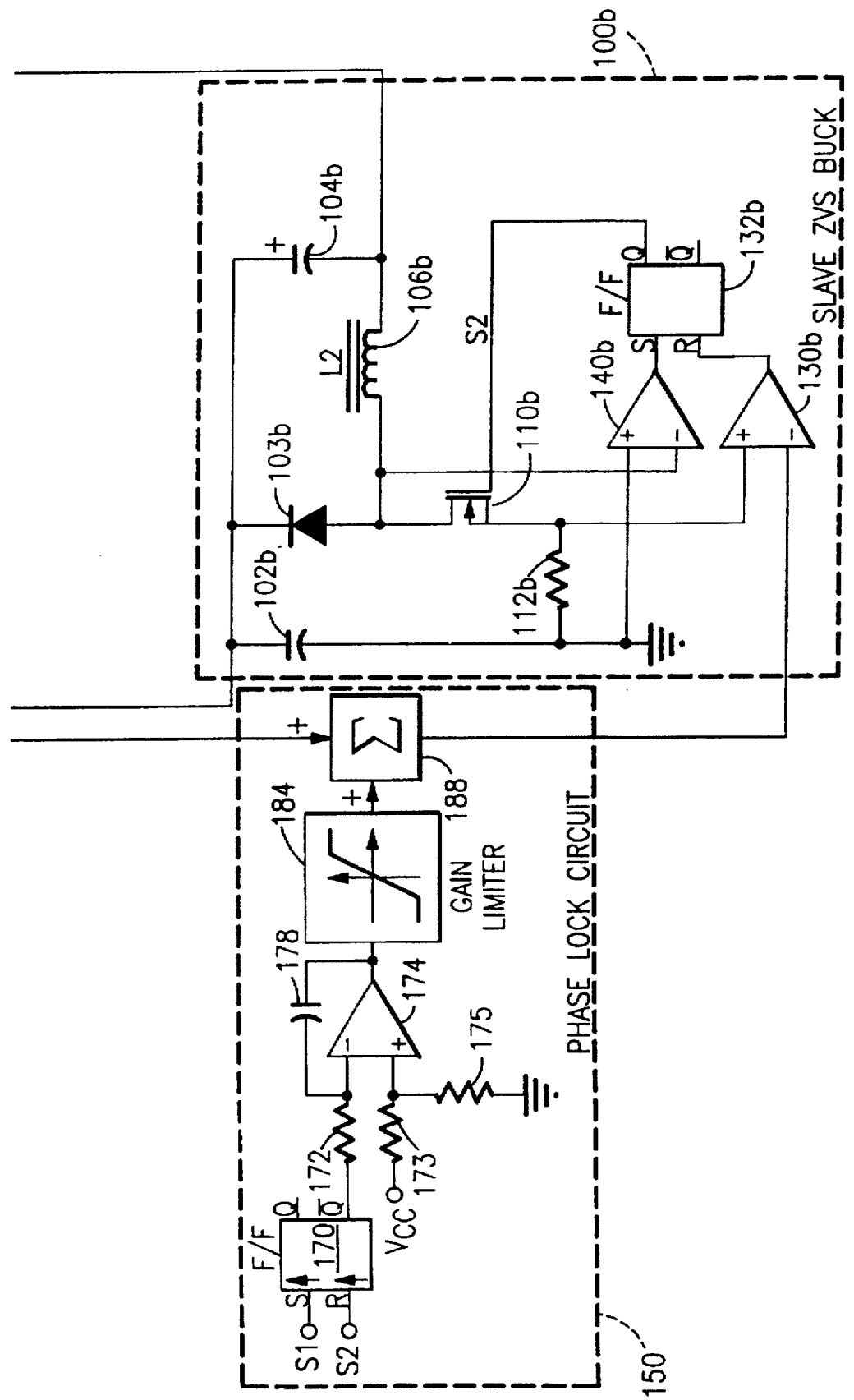
Figure 5:
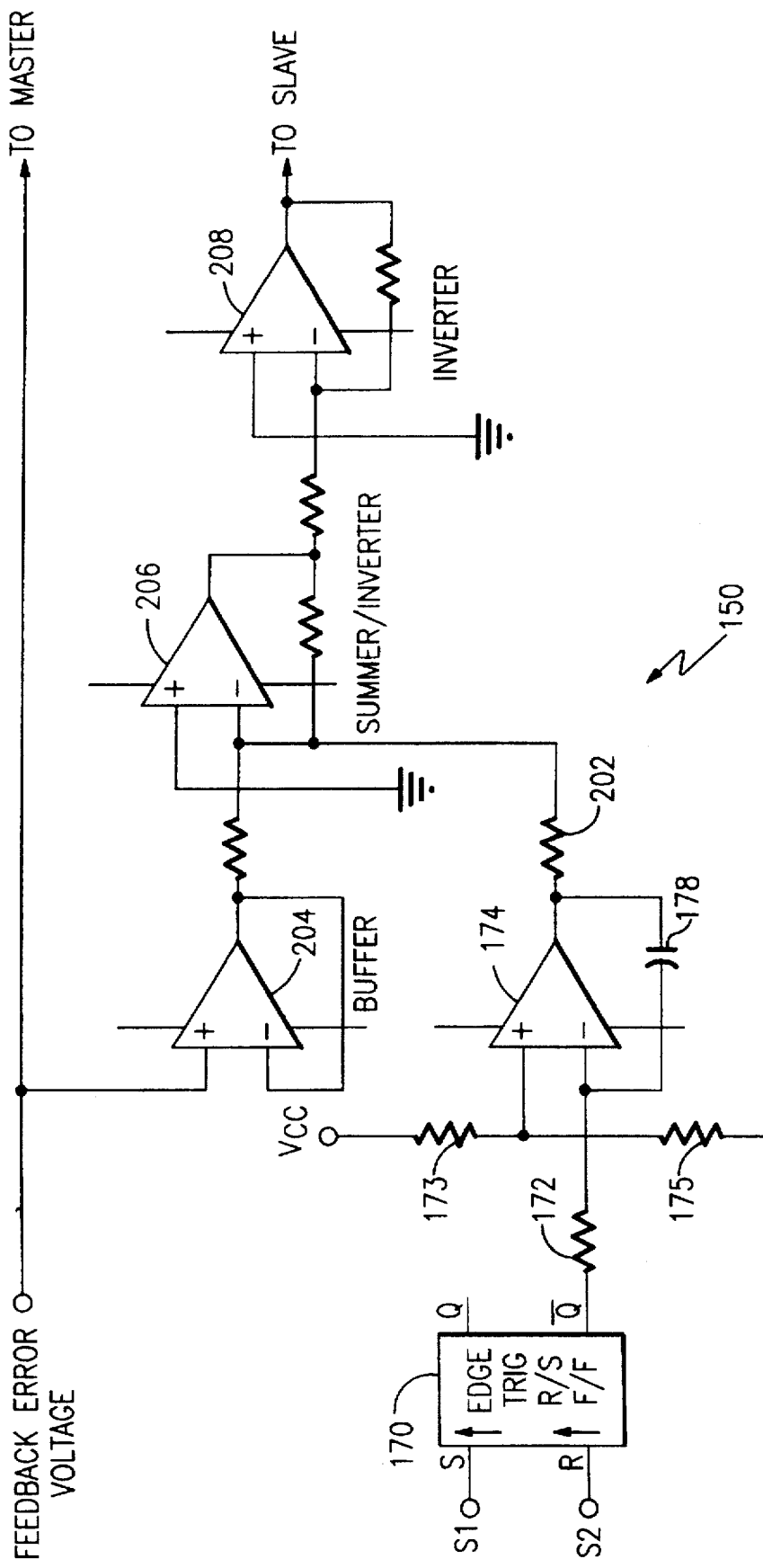
FIG. 5 is a detailed circuit diagram of a phase lock loop circuit within the composite buck power supply of FIG. 3.
Figure 6:
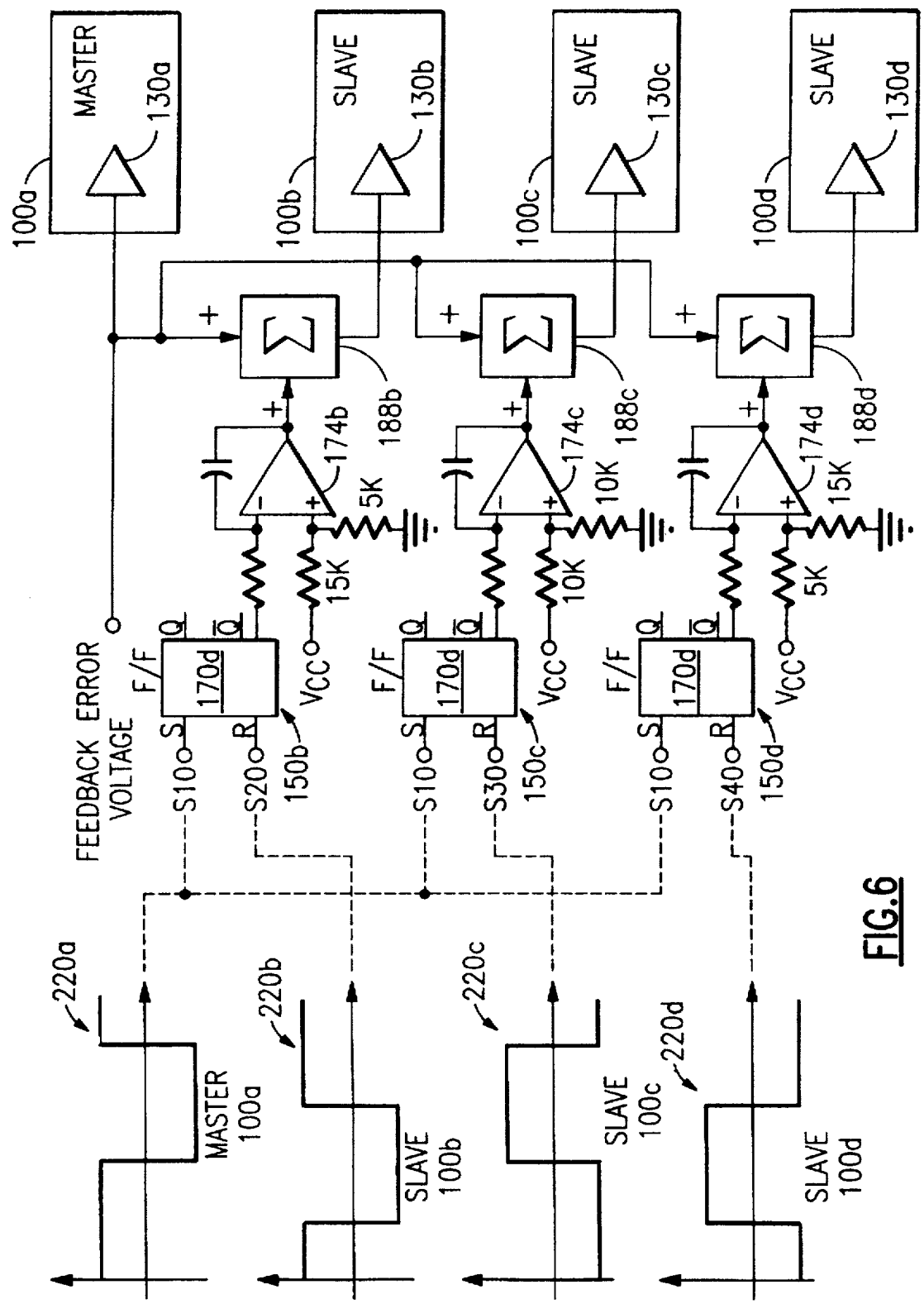
FIG. 6 is a circuit diagram of a composite buck power supply with one master power supply and three slave power supplies according to the present invention.
Figure 7A:
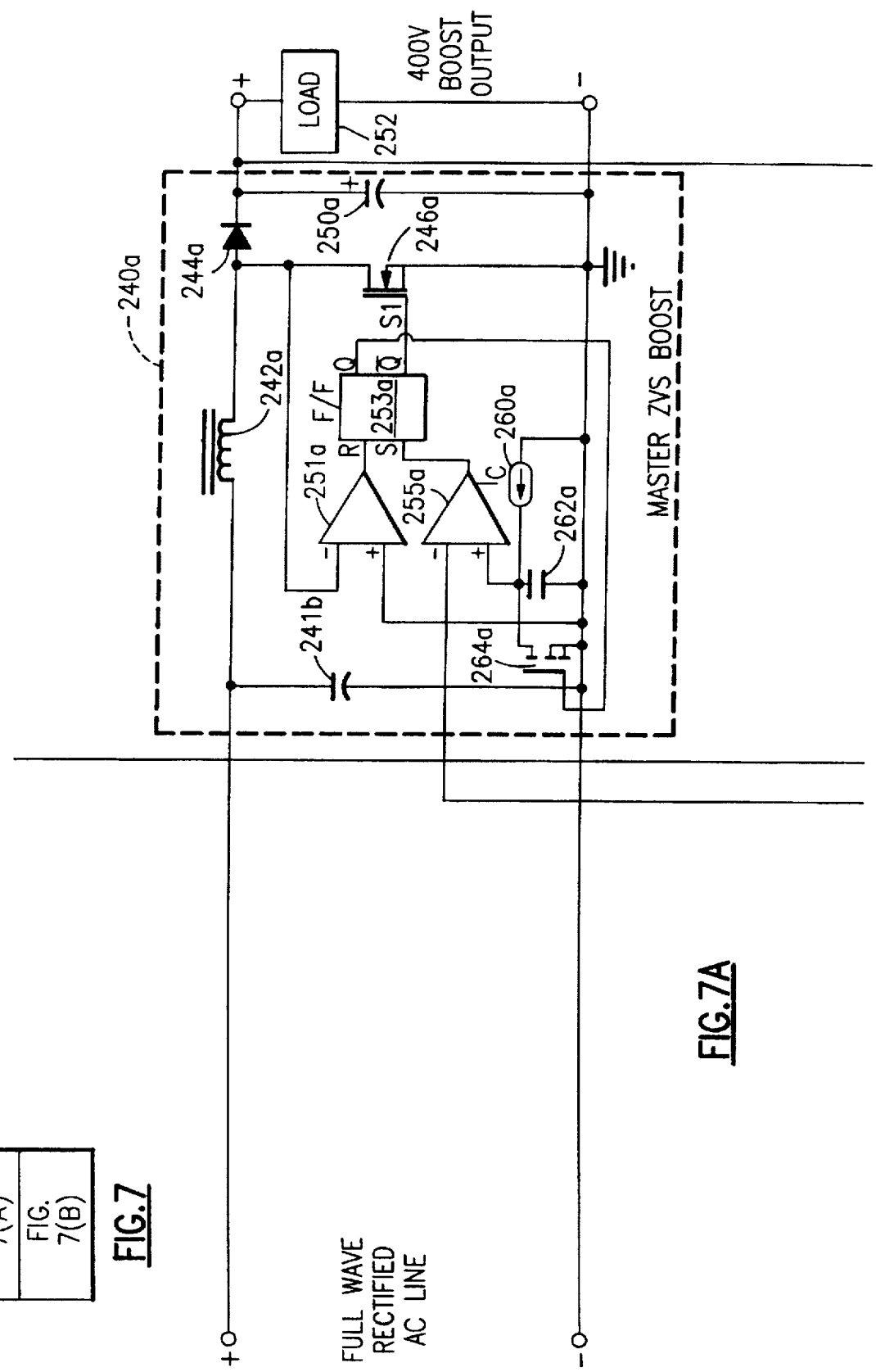
FIG. 7B, comprising FIGS. 3A and 7B in the indicated fashion,in the indicated fashion is a circuit diagram of a composite boost power supply with one master power supply and one slave power supply according to the present invention.
Figure 7B:
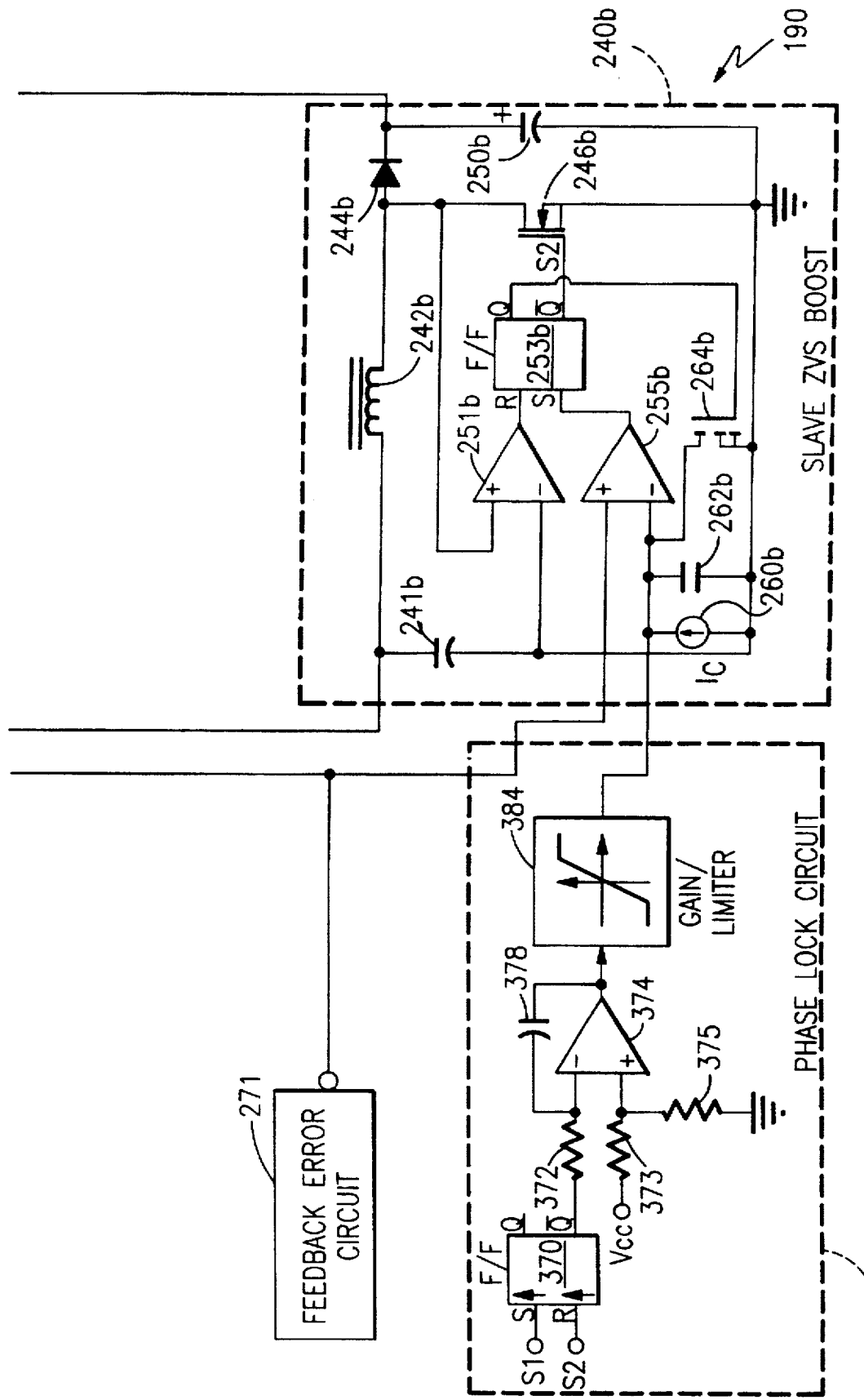

Referring now to FIGS. 3–10 in detail wherein like reference numbers indicate like elements throughout, FIG. 3B comprising FIGS. 7A and 7B in the indicated fashion illustrates a composite power supply generally designated 90 according to the present invention. Composite power supply 90 comprises a master buck power supply 100a and a slave buck power supply 100b. Master power supply 100a comprises a parallel, input filter capacitor 102a, a parallel diode 103a, a parallel output capacitor 104a, a series inductor 106a, a series FET switch 110a, and a small series current sense resistor 112a (for example 0.1 ohm). When switch 110a is closed, a current flows to a load 120 and charges capacitor 104a (and capacitor 102a). The current is returned via inductor 106a, switch 110a and resistor 112a. In the illustrated example, the input voltage is 400 volts and the load voltage is 300 volts; the 100 volt difference is dropped across inductor 106a such that the end of the inductor adjacent to the load is at higher potential than the other end. Subsequently, switch 110a is opened to block or "buck" the input power, the polarity of the voltage across inductor 106a reverses, and inductor 106a exhibits approximately 300.7 volts. (The extra 0.7 volts is due to the drop across diode 103a which is now forward biased in the current path). Capacitor 104a and inductor 106a continue to deliver stored energy to the load in the manner of a low pass filter. As the stored energy of the inductor 106a is delivered to the load, the inductor current will ramp to zero starting a resonant ring cycle that drives the FET drain voltage to zero. As described below, when the switch voltage falls just below zero volts, switch 110a will be closed to again increase the inductor current. Such closing and opening of switch 110a is repeated to yield a specified DC output voltage and current with ripple at the load.

The opening and closing of switch 110a is controlled as follows. The voltage across current sense resistor 112a is supplied to the noninverting input of a comparator 130a and the inverting input is supplied with an "error" voltage by circuitry 139. The error voltage is based on the load voltage and is generated as described below with reference to FIG. 4. When the inductor current rises above a level corresponding to the error voltage, comparator 130a resets a flip flop 132a which then shuts off, i.e. opens switch 110a. Thus, short term control is based on load current while long term control is based on load voltage. This causes the inductor current to begin to fall. This also causes a reversal of polarity of the voltage across inductor 106a as noted above. The voltage across switch 110a is supplied to the inverting input of another comparator 140a and the noninverting input is connected to ground. When the inductor current reverses, the voltage across switch 110a will fall just below zero volts and cause comparator 140a to set flip flop 132a. The setting of flip flop 132a will reactivate, i.e. close switch 110a and begin another cycle of the foregoing process. The result is zero voltage switching to minimize switching losses across switch 110a at turn ON. By way of example, capacitor 102a is 0.1 microfarads, capacitor 104a is 0.47 microfarads and inductor 106a is 0.2 millihenries.

Slave power supply 100b is composed, configured and operated identically to master power supply 100a except for the error voltage used for slave power supply 100b.

A phase lock loop circuit 150 generates the error voltage used for slave power supply 100b based on the error voltage used for master power supply 100a as follows. The Q outputs of flip flops 132a and 132b are applied as set and reset inputs, respectively to another, edge triggered flip flip flop 170. The Q NOT output of flip flop 170 is applied via a resistor 172 to the inverting input of an amplifier 174. The noninverting input of amplifier 174 is supplied with a DC reference voltage which is one half of Vcc, i.e. a resistor 173 equals a resistor 175. Amplifier 174 also has a feedback capacitor 178 such that amplifier 174 becomes an averaging or integrating circuit of the waveform output from flip flop 170. A gain/limiter control 184 is connected to the output of amplifier 174 and exhibits the illustrated linear gain/limit characteristic. A summing circuit 188 receives as one input the output of the gain/limiter control circuit 184 and another input the error voltage used for master power supply 100a. The output of the summing circuit 188 is used as the error voltage for slave power supply 100b.

Phase lock loop circuit 150 maintains the on switching of switch 110b of slave power supply 100b approximately 180 degrees out of phase with the on switching of switch 110a of master power supply 100a. This is an effective relationship to minimize ripple currents associated with the closure of switch 110b from adding to the ripple currents associated with the closure of switch 110a. When both switches are activated 180 degrees out of phase, the output of flip flop 170 is a perfect square wave with average voltage=½ Vcc. This normal "phase locked" mode will result in a small correction signal from integrator 174 that is summed with the master error signal from 139. However, when the switches 110a and 110b are not exactly 180 degrees out of phase, the input to amplifier 174 is not a perfect square wave (duty cycle not equal to 50%) and the output of amplifier 174 will integrate up or down to change the correction signal. This input adjusts the error voltage to slave power supply 100b to make the switching of switches 110a and 110b once again 180 degrees out of phase. It should be noted that because the error voltage of slave power supply 100b is adjusted, its peak inductor current will differ slightly from the master but the zero voltage switching of switch 110b is maintained. Also, because both switches 110a and 110b are 180 degrees out of phase, the composite switching noise is minimized.

The foregoing adjustments to the error voltage for slave power supply 100b are modest, for example plus or minus 10 percent, so the output current generated by slave power supply 100b is approximately the same as that of master power supply 100a. The output of slave power supply 100b is connected to the output of master power supply 100a so if the single output voltage is less than or greater than specification, the master power supply will react in a correcting manner based on the master power supply's error voltage. Thus, the master power supply 100a contributes approximately half the output power and precision control on the output/load voltage while the slave power supply 100b contributes approximately half the output power.

Figure 4:
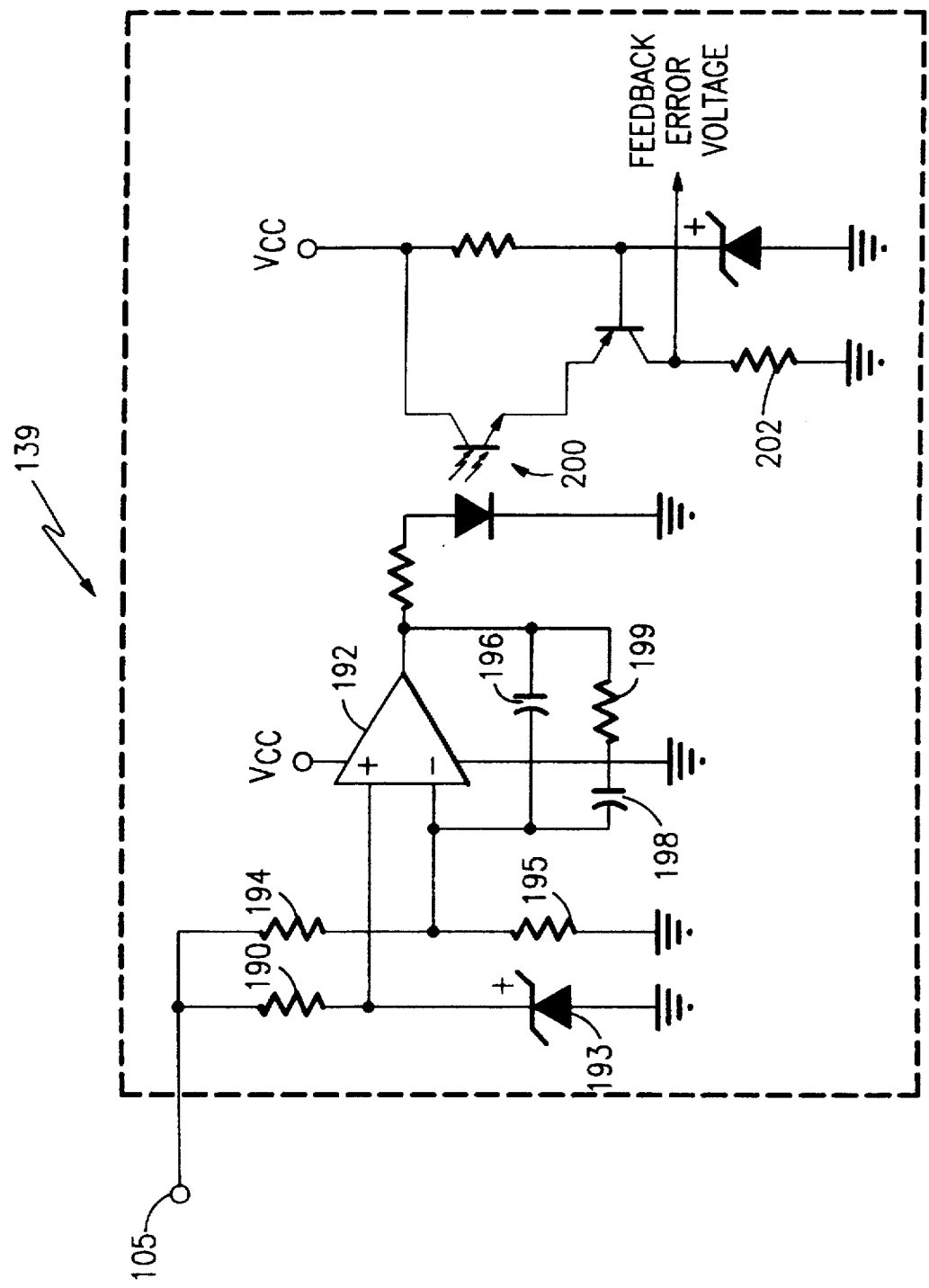
FIG. 4 is a detailed circuit diagram of an error voltage generating circuit within the composite buck power supply of FIG. 3.

FIG. 4 illustrates the error voltage generating circuit 139 in more detail. The load voltage is sensed via a resistor divider 194, 195 and compared to a reference voltage generated by resistor 190 and zener diode 193. Operational amplifier 192, along with appropriate compensation network 196, 198, 199, generates an error voltage that then passes through optocoupler 200 (in a linear manner) where the final feedback error voltage is developed across resistor 202. By way of example, resistor 190 is 20K ohms, resistor 194 is 150K ohms, resistor 195 is 17.4K ohms, zener diode breaks down at 2.5 volts, capacitor 196 is 220 picofarads, capacitor 198 is 4700 picofarads and resistor 199 is 750K ohms.

FIG. 5 illustrates the phase look loop circuit 150 in more detail. Gain/limiter 184 is provided by amplifier 174 and resistor 202. A saturation property of amplifier 174 provides the limiting function and the gain of amplifier 174 in conjunction with output resistor 202 determine the overall gain. Thus, no separate gain/limiter is required or shown. Summing circuit 188 is provided by a unity gain buffer 204 which buffers the feedback error voltage 139 from the master power supply and an amplifier 206 which actually sums the buffered feedback error voltage 139 from the master power supply and the signal from amplifier 174. Next, another amplifier 208 inverts the output of amplifier 206. The result is the feedback error signal used for the input to comparator 130b in slave power supply 100b.

FIG. 6 illustrates another composite ZVS power supply generally designated 210 according to the present invention. Power supply 210 comprises master buck power supply 100a and three slave buck power supplies 100b–d. Power supply 210 also includes phase lock loop circuits 150b–d for slave power supplies 100b–d, respectively. (The gain/limiter function within phase lock loop circuits 150b–d is inherently provided by amplifiers 174b–d, i.e. saturation and gain, and therefore is not shown separately in phase lock loop circuits 150b–d.) Ideally, the switching of each of the power supplies is evenly "spaced" throughout a 360 degree cycle. Thus, in general, for N total power supplies, the phase shift between switching of successive power supplies is N divided into 360 degrees. Therefore, for a total of four power supplies (one master and three slaves as illustrated in FIG. 6), successive power supplies are phased shifted by 90 degrees. This successive phase shifting results from the voltage applied to the noninverting input of amplifiers 174a–d. In the four power supply embodiment of FIG. 6, the noninverting input of amplifier 174b is biased with Vcc/4, the noninverting input of amplifier 174c is biased with Vcc/2, and the noninverting input of amplifier 174d is biased with 3×Vcc/4. The resultant phase relationship of the switching is illustrated by graphs 220a–d. In general, the voltage bias to amplifier 174n for N total power supplies is (n−1)×Vcc/N; the n=1master power supply does not have a phase lock loop circuit.

FIG. 7B comprising FIGS. 7A and 7B in the indicated fashion illustrates another composite power supply generally designated 190 according to another embodiment of the present invention. Composite power supply 190 comprises a master boost power supply 240a and a slave boost power supply 240b. Master boost power supply 240a comprises an input filter capacitor 241a, a series inductor 242a, a series diode 244a, a parallel FET switch 246a and a parallel output capacitor 250a. When switch 246a is closed, a current flows through inductor 242a and switch 246a to ground. Under these conditions, nearly the full input voltage is applied across inductor 242a with the input end of the inductor exhibiting a higher voltage than the other end. Diode 244a is reversed biased at this time to prevent discharge of capacitor 250a through switch 246a. However, capacitor 250a supplies the load.

Also, when switch 246a is closed, a current source 260a begins to charge a capacitor 262a. The voltage of capacitor 262a is applied to the noninverting input of comparator 255a and the inverting input is supplied by an error voltage. The error voltage is generated based on the load voltage as described below in reference to FIG. 8. When the voltage across capacitor 262a rises above the error voltage, the comparator 255a sets flip flop 253a to shut off, i.e. open switch 246a (and discharge capacitor 262a). Initially, when switch 246a is opened, inductor 242a attempts to maintain the same level and direction of current flow as existed immediately before switch 246a was opened. However, at this time the current path includes capacitor 250a and the load 252. Thus, the inductor voltage switches polarity and a voltage greater than the input voltage is developed at this other end and applied to the load 252 and capacitor 250a. Initially, this maintains the current flow through inductor 242a that existed immediately before switch 246a was opened. This current flows through inductor 242a, through diode 244a, to the load 252 and to capacitor 250a, charging capacitor 250a.

The voltage across switch 246a is applied to the inverting input of a comparator 251a and the noninverting input is connected to ground. When switch 246a is initially opened, the other end of inductor 242a exhibits a high positive voltage across switch 246a. Gradually, the energy in inductor 242a is dissipated, as the current flow through inductor 242a decreases to zero and the voltage on the other end of inductor 242a falls below ground. This causes the voltage across switch 246a to fall just below ground, and then comparator 251a resets a flip flop 253a which closes switch 246a. This causes switch 246a to close as described above to begin another cycle of switching. By way of example, inductor 242a is 54 microhenries, capacitor 250a is 940 microfarads, and capacitor 241a is 3.3 microfarads.

Slave power supply 240b is composed, configured and operated identically to master power supply 240a except for an adjustment to the charging current for capacitor 262b.

A phase lock loop circuit 350 adjusts this charging current in slave power supply 240b. The Q NOT outputs of flip flops 253a and 253b are applied as set and reset inputs, respectively to another flip flop 370. The Q NOT output of flip flop 370 is applied via a resistor 372 to the inverting input of an amplifier 374. The noninverting input of amplifier 374 is supplied with a DC reference voltage which is one half Vcc, i.e. a resistor 373 equals a resistor 375. Amplifier 374 also has a feedback capacitor 378 such that amplifier 374 becomes an averaging or integrating circuit of the waveform output from flip flop 370. A gain/limiter control circuit 384 is connected to the output of amplifier 374. The output of the gain/limiter circuit 384 is used to adjust the charging current for capacitor 262b in slave power supply 240b.

Phase lock loop circuit 350 maintains the on switching of switch 246b of slave power supply 240b approximately 180 degrees out of phase with the on switching of switch 246a of master power supply 240a. This is an effective relationship to minimize the rectified input current switch ripple associated with the closure of switch 246b and the closure of switch 246a. When both switches are activated 180 degrees out of phase, the output of flip flop 370 is a perfect square wave with an average voltage equal to one-half Vcc. This will yield a voltage at the output of amplifier 374 and a voltage at the input to the gain/limiter circuit 384. However, when the switches 246a and 246b are not exactly 180 degrees out of phase, the input to amplifier 374 is not a perfect square wave and the output of amplifier 374 is different than before. Consequently, the input voltage to gain/limiter circuit 384 is different, and this input adjusts the charging current to capacitor 262b for slave power supply 240b to make the switching of switches 246a and 246b once again 180 degrees out of phase. It should be noted that because the charging current for capacitor 262b is adjusted, the zero voltage switching of switch 246b is maintained. Also, because both switches 246a and 246b are 180 degrees out of phase, the rectified input current has minimum switch ripple.

The foregoing adjustments to the charging current for capacitor 262b are modest, for example plus or minus 10 percent, so the output current generated by slave power supply 240b is approximately the same as that of master power supply 240a. The output of slave power supply 240b is connected to the output of master power supply 240a so if the combined output voltage is less than or greater than specification, the master power supply will react in a correcting manner based on the master power supply's error voltage. Thus, the master power supply 240a contributes output power and precision control on the output/load voltage and the slave power supply 240b contributes output power at approximately the specified output/load voltage.

Figure 8:
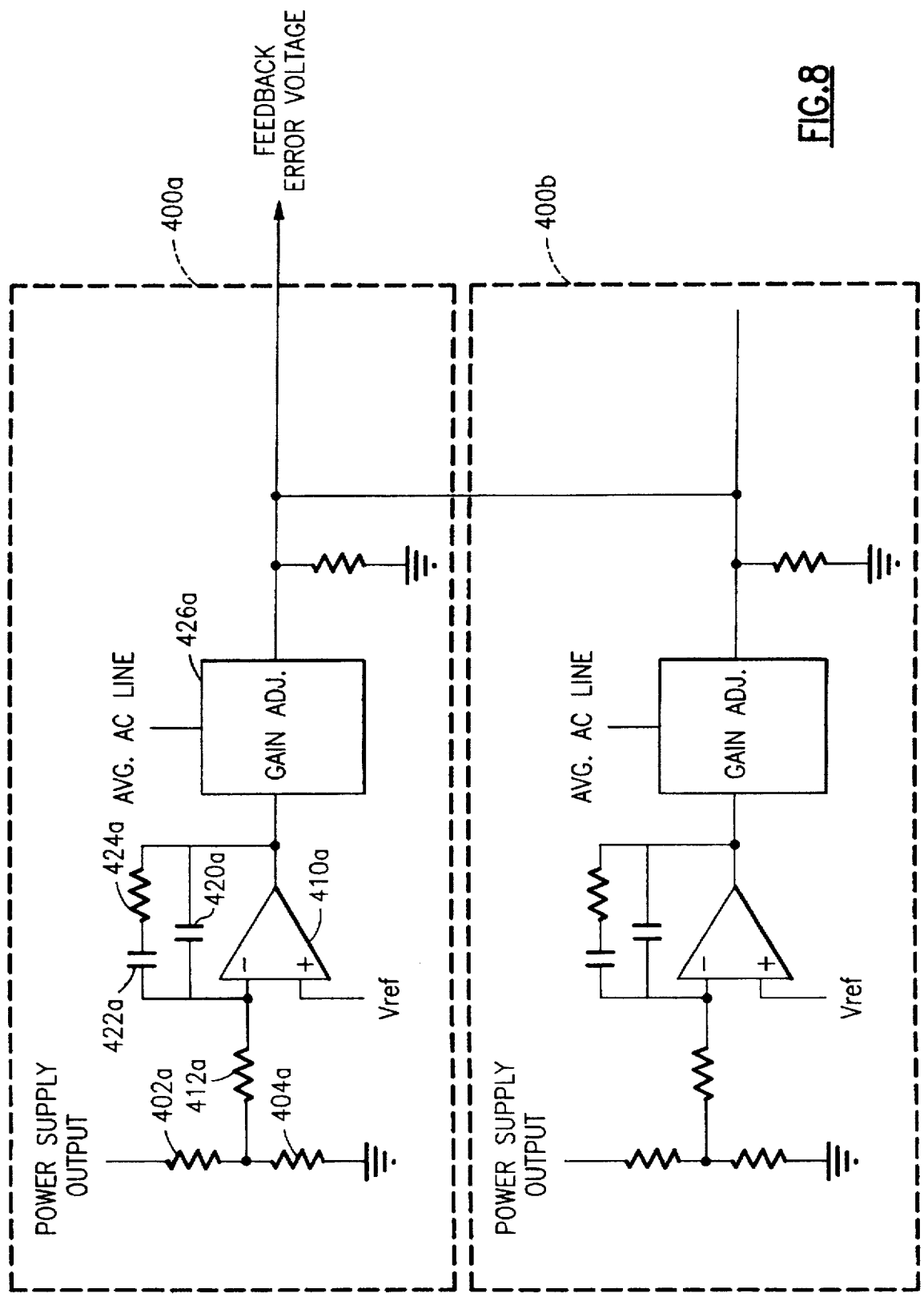
FIG. 8 is a detailed circuit diagram of an error voltage generating circuit within the boost power supply of FIG. 7.

FIG. 8 illustrates circuitry 400a to generate the feedback error voltage 271. Circuitry 400a comprises a voltage divider 402a,404a which supplies a fraction of the load voltage to the inverting input of amplifier 410a via a resistor 412a. The noninverting input is supplied with a fixed reference voltage. Capacitors 420a and 422a and a resistor 424a provide a "smoothing" effect on the output of amplifier 410a. A gain adjuster 426a as described in U.S. Pat. No. 5,264,780 and U.S. Pat. No. 5,391,947 coupled to receive the output of amplifier 410a and an average of the full wave rectified input voltage (via a low pass filter). Gain adjuster 426a adjusts the output of amplifier 410a to compensate for effects of variation of the input voltage. U.S. Pat. No. 5,264,780 and U.S. Pat. No. 5,391,947 are hereby incorporated by reference as part of the present disclosure. The output of gain adjuster 426a is the feedback error voltage 271. By way of example, resistor 402a is 728K ohms, resistor 404a is 9.09K ohms, resistor 412a is 110K ohms, capacitor 420a is 4700 picofarads, capacitor 422a is 0.22 microfarads and resistor 424a is 2 meg ohms. FIG. 8 also illustrates a second circuit 400b, identical to circuit 400a, for generating the feedback error voltage. The output of circuit 400a is connected to the output of circuit 400b and the inputs are the same. While only one such circuit 400a or 400b is required, the embodiment of FIG. 8 uses a modular technique for the power supplies, and each power supply module includes error generating circuitry.

Figure 9:
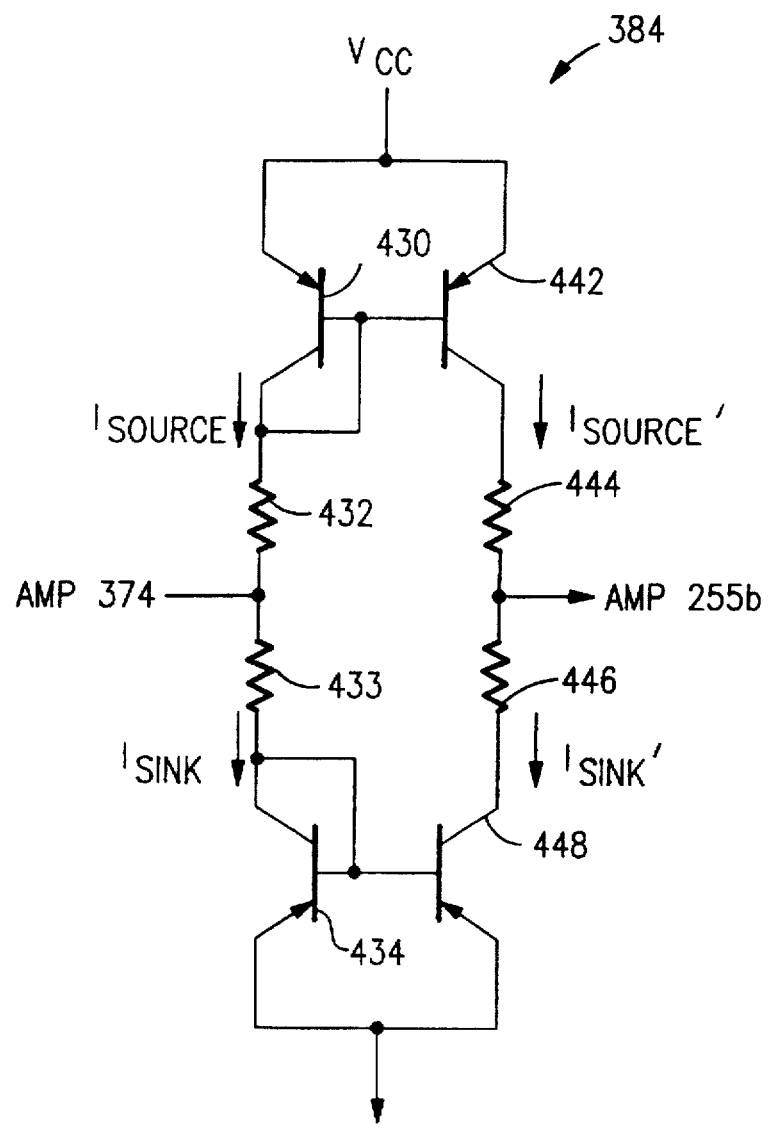
FIG. 9 is a detailed circuit diagram of a gain/limiter circuit within the boost power supply of FIG. 7.

FIG. 9 illustrates gain/limiter circuit 384 in more detail. Gain/limiter circuit 384 comprises an input "leg" comprising a pnp transistor 430, series resistors 432 and 433, and a series npn transistor 434. This yields a source current Isource passing through transistor 430 and a sink current Isink passing through transistor 434. Gain/limiter circuit 384 also comprises an output "leg" comprising a pnp transistor 442, series resistors 444 and 446, and a series npn transistor 448. The current through pnp transistor 442 mirrors the current through pnp transistor 430. When slave power supply switches 180 degrees out of phase from the master power supply, amplifier 374 outputs a nominal voltage level, and the current limiter 384 supplies a nominal current to or sinks a nominal current from capacitor 262b. However, when the slave and master power supplies do not switch 180 degrees out of phase with each other, amplifier 374 outputs a voltage different than the nominal voltage, and gain limiter circuit 384 supplies a different current to or sinks a different current from capacitor 262b to cause slave power supply 240b to switch 180 degrees out of phase with master power supply 240a.

One function of gain/limiter circuit 384 is to convert a voltage level output from amplifier 374 representing a phase relationship between the master and slave power supplies to a corresponding current supplied to or sunk from capacitor 262b. Another function of gain/limiter circuit 384 is to participate in limiting the magnitude of the current supplied to or sunk from capacitor 262b, as follows. Amplifier 374 is inherently limited in its output voltage swing due to its DC supply voltages. The resistors 432 and 433 then limit the output current supply or sink to a corresponding level. By way of example, resistor 432 is 48.7 kohms, resistor 433 is 9.09 kohms, resistor 444 is 100 ohms, resistor 446 is 100 ohms and the output of the gain/limiter circuit 384 is limited to plus or minus 200 microamps. A third function of gain/limiter circuit 374 is isolation.

Figure 10:
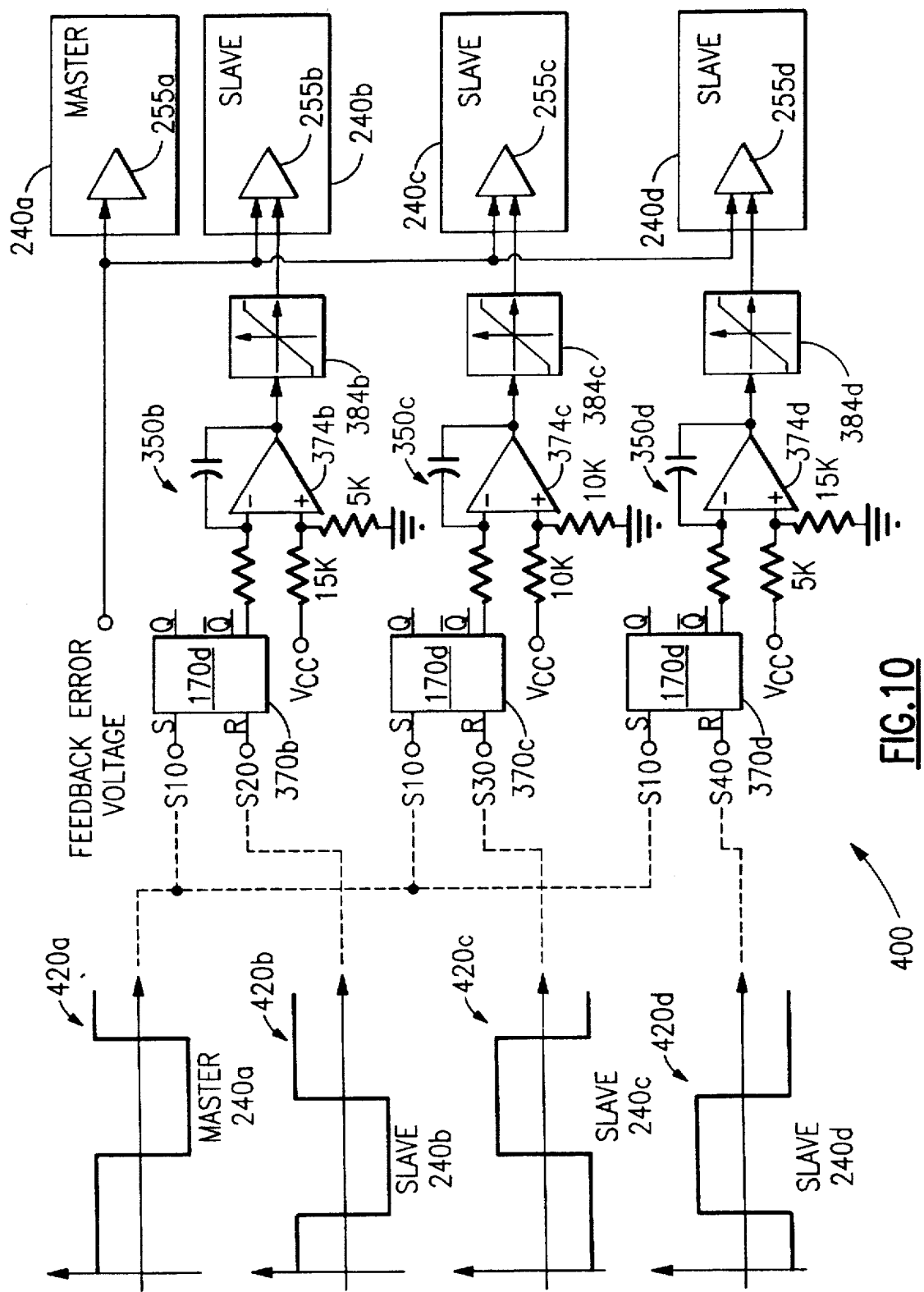
FIG. 10 is a circuit diagram of a composite boost power supply with one master power supply and three slave power supplies according to the present invention.

FIG. 10 illustrates another composite ZVS power supply generally designated 400 according to the present invention. Power supply 400 comprises master boost power supply 240a and three slave boost power supplies 240b –d. Power supply 400 also includes phase lock loop circuits 350b–d for slave power supplies 240b–d, respectively. Ideally, the switching of each of the power supplies is evenly "spaced" through a 360 degree cycle. Thus, in general, for N total power supplies, the phase shift between switching of successive power supplies is N divided into 360 degrees. Therefore, for a total of four power supplies (one master and three slaves as illustrated in FIG. 10), successive power supplies are phased shifted by 90 degrees. This successive phase shifting results from the voltage applied to the noninverting input of amplifiers 374b–d . In the four power supply embodiment of FIG. 6, the noninverting input of amplifier 374b is biased with Vcc/4, the noninverting input of amplifier 374c is biased with Vcc/2, and the noninverting input of amplifier 374d is biased with 3×Vcc/4. The resultant phase relationship of the switching is illustrated by graphs 420a–d . In general, the voltage bias to amplifier 374n for N total power supplies is (n−1)×Vcc/N; the n=1 master power supply does not have a phase lock loop circuit.

Based on the foregoing, composite ZVS power supplies according to the present invention have been disclosed. However, numerous modifications and substitutions can be made without deviating from the scope of the present invention. For example, the power supplies need not be evenly "spaced" throughout the 360 degree cycle in order to reduce composite switching ripple. As long as the switching of two power supplies is not coincident there will be less composite switching ripple than if the switching of two power supplies is coincident. Therefore, as long as the reference voltage input to amplifiers 174n or 374n are substantially different than each other, no two power supplies will switch at the same time and this may provide acceptable composite switching ripple. Therefore, the invention has been disclosed by way of illustration and not limitation and reference should be made to the following claims to determine the scope of the present invention.

We claim:

1. A composite power supply comprising:

a master ZVS power supply comprising a first ZVS switch with (a) a first switch control to turn off said first switch based on a comparison of a voltage corresponding to the load voltage or current and an output error voltage and (b) a second switch control to turn on said first switch when a voltage across said first switch is approximately zero volts;

a slave ZVS power supply comprising a second ZVS switch with (c) a third switch control to turn off said second switch based on a comparison of a voltage corresponding to the load voltage or current and a reference voltage and (d) a fourth switch control to turn on said second switch when a voltage across said second switch is approximately zero volts; and means for producing a pulse-width-modulated ("PWM") signal having a duty cycle corresponding to an actual phase angle between the switching-on of said first switch and the switching-on of said second switch;

an averaging or integrating circuit for receiving said PWM signal and generating an adjustment signal having a magnitude proportional to a phase difference between (i) a pre-determined phase angle between the switching of said first and second switches (ii) the actual phase angle between the switching of said first and second switches; and means for summing said first reference voltage with said adjustment signal, said summing means having an output providing said reference voltage for said slave ZVS power supply to thereby minimize said phase difference.

2. A composite power supply as set forth in claim 1 wherein said master power supply is a buck power supply and said slave power supply is a buck power supply.

3. A composite power supply as set forth in claim 2 wherein an output of said master power supply is connected to an output of said slave power supply.

4. A composite power supply as set forth in claim 2 wherein said master power supply and said slave power supply are variable frequency.

5. A composite power supply as set forth in claim 2 wherein said predetermined phase angle equals a total number of power supplies in said composite power supply divided into 360 degrees.

6. A composite power supply as set forth in claim 2 wherein said output error voltage is a difference between a voltage corresponding to the load voltage and a fixed reference voltage which difference signifies the maximum permissible deviation of the load voltage from a nominal value.

7. A composite power supply as set forth in claim 2 wherein said PWM signal means comprises a flip flop coupled to receive said first and third switch controls as inputs.

8. A composite power supply as set forth in claim 2 wherein said master power supply comprises a capacitor in parallel with an output of said master power supply and comprises an inductor in series with said output, and said first switch is in series with said inductor.

9. A composite power supply as set forth in claim 2, including a plurality of said slave power supplies wherein said pre-determined phase angle between the switching of said master power supply and the switching of a given ZVS slave power supply is selected from the set of M*360/N degrees, M=1. . . N−1, where M is an integer, N is the total number of power supplies, and no two slave ZVS power supplies have the same phase relationship with respect to the master power supply.

10. A composite power supply as set forth in claim 8 wherein said second switch control comprises a first comparator having inputs connected across said first switch and said first switch control comprises a second comparator having inputs connected to respond to said load current or load voltage, the outputs of said first and second comparators turning on said first switch when said first switch exhibits approximately zero volts and turning off said first switch when the load current or voltage exhibits a predetermined level.

11. A composite power supply as set forth in claim 10 wherein said master power supply further comprises a flip flop having input s coupled to receive outputs of said first and second comparators and having an output coupled to control said first switch.

12. A composite power supply as set forth in claim 10 wherein said third switch control comprises a third comparator having inputs connected across said second switch and said fourth switch control comprises a fourth comparator having inputs connected to respond to a load current or load voltage, the outputs of said third and fourth comparators turning on said second switch when said second switch exhibits approximately zero volts and turning off second switch when the load current or voltage exhibits a predetermined level.

13. A composite power supply comprising:
a master ZVS power supply comprising a first switch with (a) first switch control to turn off said first switch based on a comparison of a first output error voltage and a first reference voltage provided across a first capacitor which is charged by a first current source and (b) a second switch control to turn on said first switch when a voltage across said first switch is approximately zero volts;

a slave ZVS power supply comprising a second switch with (c) a third switch control to turn off said second switch based on a comparison of a second output error voltage and a second reference voltage provided across a second capacitor which is charged by a second current source and (d) a fourth switch control to turn on said second switch when a voltage across said second switch is approximately zero volts;

means for producing a pulse-width-modulated ("PWM") signal having a duty cycle corresponding to an actual phase angle between the switching-on of said first switch and the switching-on of said second switch;

an averaging or integrating circuit for receiving said PWM signal and generating an adjustment signal having a magnitude proportional to a phase difference between (i) a pre-determined phase angle between the switching of said first and second switches and (ii) the actual phase angle between the switching of said first and second switches; and means for increasing or decreasing charging current to said second capacitor in proportion to the magnitude of said adjustment signal in order to minimize said phase difference.

14. A composite power supply as set forth in claim 13 wherein said master power supply is a boost power supply and said slave power supply is a boost power supply.

15. A composite power supply as set forth in claim 14 wherein said PWM signal means comprises a flip flop coupled to receive said first and third switch controls as inputs, an output of said flip flop being coupled to an input of said averaging or integrating circuit.

16. A composite power supply as set forth in claim 14 wherein an output of said master power supply is connected to an output of said slave power supply.

17. A composite power supply as set forth in claim 14 wherein said master power supply and said slave power supply are variable frequency.

18. A composite power supply as set forth in claim 14, including a plurality of said slave power supplies wherein said pre-determined phase angle between the switching of said master power supply and the switching of a given ZVS slave power supply is selected from the set of M*360/N degrees, M=1. . . N−1, where M is an integer, N is the total number of power supplies, and no two slave ZVS power supplies have the same phase relationship with respect to the master power supply.

19. The composite power supply according to claim 14 wherein said first and second output error voltages are the same and equal to a feedback error voltage which signifies the maximum permissible deviation of the load voltage from a nominal value.

20. A composite power supply, comprising:
a master ZVS power supply comprising a first switch with (a) a first switch control to open or turn off said first switch based on a comparison of (i) a voltage corresponding to a first ramp signal and (ii) a first reference voltage, and (b) a second switch control to turn on said first switch when a voltage across said first switch is approximately zero volts;

a slave ZVS power supply comprising a second switch with (c) a third switch control to open or turn off said second switch based on a comparison of (i) a voltage corresponding to a second ramp signal and (i) a second reference voltage and (d) a fourth switch control to turn on said second switch when a voltage across said second switch is approximately zero volts;

means for producing a signal which is substantially balanced when an actual phase angle between the switching-on of said first switch and the switching-on of said second switch substantially equals a pre-determined phase angle and is unbalanced otherwise;

an averaging or integrating circuit for receiving said balanced/unbalanced signal and generating an adjustment signal indicative of a phase difference between (i) said actual phase angle between the switching of said first and second switches and (ii) said pre-determined phase angle; and means for adjusting said second ramp signal or said second reference voltage in accordance with said adjustment signal in order to reduce said phase difference and substantially maintain the switching of said first and second switches at said pre-determined phase angle.

21. The composite power supply according to claim 20 wherein the means for producing said balanced/unbalanced signal comprises a means for producing a pulse-width-modulated ("PWM") signal having a duty cycle corresponding to an actual phase angle between the switching-on of said first switch and the switching-on of said second switch.

22. The composite power supply according to claim 21, wherein said PWM signal means comprises a flip flop coupled to receive said first and third switch controls as inputs.

23. The composite power supply according to claim 21, wherein said averaging or integrating circuit generates an adjustment signal whose magnitude is proportional to said phase difference between (i) said actual phase angle between the switching of said first and second switches and (ii) said pre-determined phase angle.

24. The composite power supply according to claim 20 wherein:

(a) said master and slave ZVS power supplies are buck-type power supplies;

(b) said first ramp signal corresponds to a fluctuating load voltage or current and said second ramp signal corresponds to a fluctuating load voltage or current; and (c) said adjustment means comprises a summing circuit for summing said first reference voltage with said adjustment signal, said summing means having an output which provides said second reference voltage.

25. The composite power supply according to claim 24, wherein said first and second ramp signals are substantially equal.

26. The composite power supply according to claim 20, wherein:

(a) said master and slave ZVS power supplies are boost-type power supplies;

(b) said first and second ramp signals are provided by first and second capacitors which are charged by respective first and second current sources; and (c) said adjustment means comprises a means for increasing and decreasing the charging current to said second capacitor.

27. The composite power supply according to claim 20, wherein said first and second reference voltages are substantially equal.

* * * * *